US008159488B2

(12) United States Patent
Kim

(10) Patent No.: US 8,159,488 B2
(45) Date of Patent: Apr. 17, 2012

(54) VOLTAGE STABILIZING CIRCUIT AND DISPLAY APPARATUS HAVING THE SAME

(75) Inventor: Kyung-Yul Kim, Busan (KR)

(73) Assignee: Samsung Electronics Co., Ltd. (KR)

( * ) Notice: Subject to any disclaimer, the term of this patent is extended or adjusted under 35 U.S.C. 154(b) by 512 days.

(21) Appl. No.: 12/411,535

(22) Filed: Mar. 26, 2009

(65) Prior Publication Data

US 2010/0045651 A1 Feb. 25, 2010

(30) Foreign Application Priority Data

Aug. 22, 2008 (KR) ........................ 10-2008-0082402

(51) Int. Cl.
*G06F 3/038* (2006.01)

(52) U.S. Cl. ........................... 345/212; 345/211; 345/90

(58) Field of Classification Search ........................ None
See application file for complete search history.

(56) References Cited

U.S. PATENT DOCUMENTS

2004/0113881 A1* 6/2004 Kim ................................ 345/97

FOREIGN PATENT DOCUMENTS

| | | | |
|---|---|---|---|
| KR | 1020040061050 | A | 7/2004 |
| KR | 1020040077010 | A | 9/2004 |
| KR | 10200400885314 | A * | 10/2004 |
| KR | 10-0554217 | | 2/2006 |
| KR | 1020060112908 | A | 11/2006 |
| KR | 10-0666446 | | 1/2007 |
| KR | 10-0730593 | | 6/2007 |
| KR | 1020070117043 | A | 12/2007 |

* cited by examiner

*Primary Examiner* — Muhammad N Edun
(74) *Attorney, Agent, or Firm* — Cantor Colburn LLP

(57) ABSTRACT

A display apparatus includes a display panel, a printed circuit board, a data driver and a gate driver. The data driver includes a digital processor and an analog processor, and receives image data and a data control signal to provide the display panel with a data signal. The printed circuit board includes a first voltage interconnection which supplies a first source supply voltage to the digital processor of the data driver, and a second voltage interconnection electrically isolated from the first voltage interconnection and which supplies a second source supply voltage to the analog processor of the data driver.

18 Claims, 5 Drawing Sheets

VOLTAGE STABILIZING CIRCUIT AND DISPLAY APPARATUS HAVING THE SAME

This application claims priority to Korean Patent Application No. 2008-82402, filed on Aug. 22, 2008, and all the benefits accruing therefrom under 35 U.S.C. §119, the contents of which in its entirety are herein incorporated by reference.

BACKGROUND OF THE INVENTION

1. Field of the Invention

The present invention relates to a display apparatus. More particularly, the present invention relates to a display apparatus capable of increasing a driving margin.

2. Description of the Related Art

In general, a liquid crystal display ("LCD") displays an image by adjusting light transmittance through liquid crystal in liquid crystal cells using an electric field. To this end, the LCD typically includes a liquid crystal display panel, in which the liquid crystal cells are arranged in a substantially matrix pattern, and a driving circuit which drives the liquid crystal display panel.

The driving circuit typically includes a gate driver which drives gate lines provided in the liquid crystal display panel, and a data driver which drives data lines provided in the liquid crystal display panel. In general, the gate driver and the data driver are integrated into chips. The chips are generally mounted on a tape carrier package ("TCP"), and the chips are connected to the liquid crystal display panel using a tape automated bonding ("TAB") method or, alternatively, are mounted on the liquid crystal display panel using a chip on glass ("COG") method.

In the LCD using the chip on glass method, a chip driving margin is reduced due to power loss which occurs when the chips are mounted on the liquid crystal display panel, for example.

BRIEF SUMMARY OF THE INVENTION

An exemplary embodiment of the present invention provides a display apparatus having a substantially increased driving margin of a data driver by utilizing a substantially stabilized supply voltage applied to the data driver.

In an exemplary embodiment of the present invention, a display apparatus includes a display panel, a printed circuit board, a data driver and a gate driver. The display panel displays an image. The printed circuit board includes a control circuit. The control circuit outputs image data, a data control signal and a gate control signal. The data driver includes a digital processor and an analog processor, and receives the image data and the data control signal to provide the display panel with a data signal. The gate driver receives the gate control signal to provide the display panel with a gate signal.

The printed circuit board includes a first voltage interconnection and a second voltage interconnection electrically isolated from the first voltage interconnection. The first voltage interconnection supplies a first source supply voltage to the digital processor of the data driver. The second voltage interconnection supplies a second source supply voltage to the analog processor of the data driver.

In alternative exemplary embodiment of the present invention, a voltage stabilizing circuit removes noise components from a first source supply voltage and a second source supply voltage supplied to a first terminal and a second terminal, respectively, of a data driver of a display apparatus. The voltage stabilizing circuit includes a first filter disposed between the first terminal and a first feedback terminal of the data driver, and which supplies the first source supply voltage to the first terminal, and which filters the noise component of the first source supply voltage, received from the first feedback terminal, to supply the first terminal with a first filtered source supply voltage. The voltage stabilizing circuit further includes a second filter disposed between the second terminal and a second feedback terminal of the data driver, and which supplies the second source supply voltage to the second terminal, and which filters the noise component of the second source supply voltage, received from the second feedback terminal, to supply the second terminal with a second filtered source supply voltage.

Thus, a first source supply voltage a second source supply voltage include a ground voltage level, and the first voltage interconnection and the second voltage interconnection are electrically isolated from each other on a printed circuit board. As a result, the first and source supply voltage and the second source supply are applied to the first voltage interconnection and the second voltage interconnection, respectively. Therefore, the first source supply voltage and the second source supply voltage are effectively prevented from being distorted due to noise components generated from the first source supply voltage or the second source supply voltage, thereby substantially increasing a driving margin of a data driver according to an exemplary embodiment of the present invention.

BRIEF DESCRIPTION OF THE DRAWINGS

The above and other aspects, features and advantages of the present invention will become readily apparent by describing in further detail exemplary embodiments thereof with reference to the accompanying drawings, in which.

DETAILED DESCRIPTION OF THE INVENTION

Figure 1:
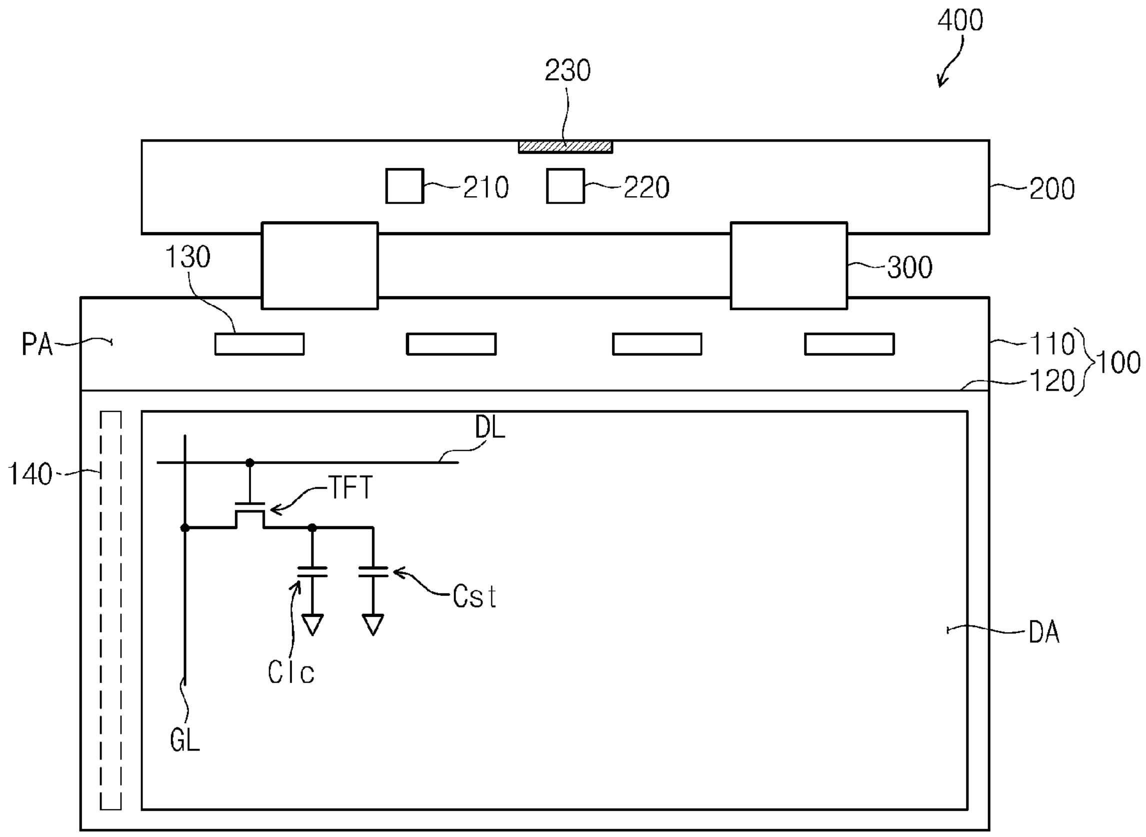
FIG. 1 is a plan view illustrating an exemplary embodiment of a display apparatus according to the present invention.

The invention will now be described more fully hereinafter with reference to the accompanying drawings, in which exemplary embodiments of the invention are shown. The present invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including," when used in this specification, specify the presence of stated features, regions, integers, steps, operations, elements and/or components, but do not preclude the presence or addition of one or more other features, regions, integers, steps, operations, elements, components and/or groups thereof.

Furthermore, relative terms, such as "lower" or "bottom" and "upper" or "top" may be used herein to describe one element's relationship to other elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on the "upper" side of the other elements. The exemplary term "lower" can, therefore, encompass both an orientation of "lower" and "upper," depending upon the particular orientation of the figure. Similarly, if the device in one of the figures were turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning which is consistent with their meaning in the context of the relevant art and the present disclosure, and will not be interpreted in an idealized or overly formal sense unless expressly so defined herein.

Exemplary embodiments of the present invention are described herein with reference to cross section illustrations which are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes which result, for example, from manufacturing. For example, a region illustrated or described as flat may, typically, have rough and/or nonlinear features. Moreover, sharp angles which are illustrated may be rounded. Thus, the regions illustrated in the figures are schematic in nature and their shapes are not intended to illustrate the precise shape of a region and are not intended to limit the scope of the present invention.

Hereinafter, exemplary embodiments of the present invention will be described in further detail with reference to the accompanying drawings.

Figure 2:
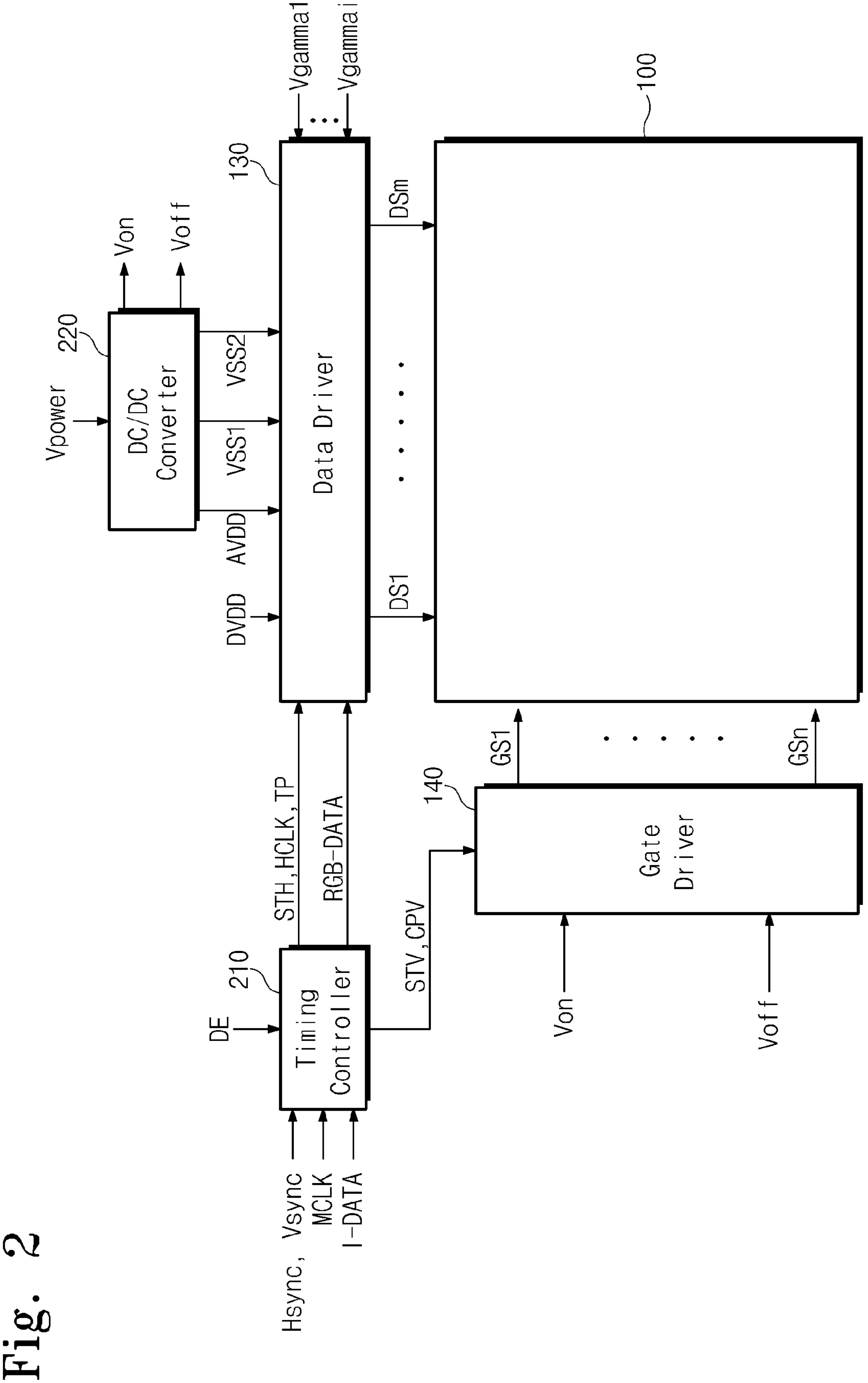
FIG. 2 is a block diagram of the display apparatus shown in FIG. 1.

FIG. 1 is a plan view illustrating an exemplary embodiment of a display apparatus according to the present invention, and FIG. 2 is a block diagram of the display apparatus shown in FIG. 1.

Referring to FIG. 1, a display apparatus 400 includes a liquid crystal display panel 100 which displays an image, a printed circuit board ("PCB") 200 disposed substantially adjacent to the liquid crystal display panel 100, and a flexible circuit film 300 which electrically connects the liquid crystal display panel 100 to the printed circuit board 200.

The liquid crystal display panel 100 according to an exemplary embodiment includes an array substrate 110, a color filter substrate 120 disposed opposite to, e.g., facing, the array substrate 110, and a liquid crystal layer (not shown) interposed between the array substrate 110 and the color filter substrate 120. The array substrate 110 includes a display area DA which displays an image, and a peripheral area PA substantially surrounding a periphery the display area DA.

A plurality of pixels are disposed in the display area of the array substrate 110 in a substantially matrix pattern. More specifically, the display area DA includes a plurality of gate lines GL and a plurality of data lines DL. Gate lines GL of the plurality of gate lines GL extend in a first direction and are spaced apart from each other at predetermined intervals. Data lines DL of the plurality of data lines DL extend in a second direction, substantially perpendicular to the first direction, and are also spaced apart from each other at predetermined intervals. The data lines DL and the gate lines GL cross each other and are disposed on different layers to be electrically insulated from each other.

In an exemplary embodiment of the present invention, pixel areas are defined in the display area DA by the gate lines GL and the data lines DL. Each pixel area includes a pixel having a thin film transistor TFT, a liquid crystal capacitor Clc and a storage capacitor Cst. The thin film transistor TFT includes a gate electrode connected to a corresponding gate line GL of the gate lines GL, a source electrode connected to a corresponding data line DL of the data lines DL, and a drain electrode connected to a pixel electrode which serves as an electrode of the liquid crystal capacitor Clc. The storage capacitor Cst is connected in electrical parallel with the liquid crystal capacitor Clc.

In an exemplary embodiment, the color filter substrate 120 includes a color filter and a common electrode (neither shown). Further, the color filter includes red, green and/or blue color pixels. In addition, the common electrode may be disposed on an entire surface of the color filter substrate 120, and may face the pixel electrode to form the liquid crystal capacitor Clc.

The display apparatus 400 according to an exemplary embodiment includes a data driver 130 and a gate driver 140.

The data driver 130 includes a plurality of chips and is disposed on the peripheral area PA of the liquid crystal display panel 100. The data driver 130 is electrically connected to the data lines DL to provide a data signal thereto. In an exemplary embodiment, the data driver 130 includes more than one chip. However, alternative exemplary embodiments of the present invention are not limited thereto. For example, the data driver 130 according to an alternative exemplary embodiment may include only one chip.

The gate driver 140 includes a plurality of amorphous silicon ("a-Si") transistors, and, in an exemplary embodiment, is directly formed in the peripheral area PA of the array substrate 110 using a thin film transistor manufacturing process. The gate driver 140 is disposed substantially adjacent to an end of the gate lines GL to sequentially apply a gate signal to each of the gate lines GL.

The display apparatus 400 includes a timing controller 210 which controls a driving operation of the data driver 130 and the gate driver 140, and a DC/DC converter 220 which supplies the data driver 130 and the gate driver 140 with voltages, as will be described in further detail below with reference to FIG. 2. In an exemplary embodiment, the timing controller 210 and the DC/DC converter 220 are disposed on the printed circuit board 200.

The printed circuit board 200 according to an exemplary embodiment further includes a connector 230 which receives signals from an external apparatus or device (not shown) to provide the timing controller 210 with the signals. Moreover, the connector 230 according to an exemplary embodiment receives the signals from the external apparatus using a low voltage differential signal interface scheme, for example.

Referring to FIG. 2, the timing controller 210 receives a data enable signal DE, a vertical synchronization signal Vsync and a horizontal synchronization signal Hsync, a main clock signal MCLK and image data I-DATA from the connector 230 (FIG. 1). The timing controller 210 converts the image data I-DATA to red, green and blue data RGB-DATA and provides the data driver 130 with the red, green and blue data RGB-DATA. The timing controller 210 generates a data control signal and a gate control signal using the data enable signal DE, the main clock signal MCLK, the vertical synchronization signal Vsync and the horizontal synchronization signal Hsync, and outputs the data control signal and the gate control signal to the data driver 130 and the gate driver 140, respectively.

The DC/DC converter 220 receives an external power Vpower to generate an analog driving voltage AVDD, a first source supply voltage VSS1 and a second source supply voltage VSS2, and supplies the analog driving voltage AVDD to the data driver 130. Further, the DC/DC converter 220 generates a gate-on voltage Von and a gate-off voltage Voff to supply the gate driver 140 therewith.

In an exemplary embodiment, the display apparatus 400 may further include a common voltage generator (not shown) which provides a common voltage to the liquid crystal display panel 100, and a gamma voltage generator (not shown) which provides gamma voltages Vgamma1 to Vgammai to the data driver 130.

The data driver 130 receives the data control signal and the red, green and blue data RGB-DATA from the timing controller 210 to output a plurality of data signals DS1 to DSm. The data control signal includes a horizontal start signal STH, a horizontal clock signal HCLK and an output start signal TP. The horizontal start signal STH represents a start signal for an operation of the data driver 130, the horizontal clock signal HCLK is a synchronization signal for the red, green and blue data RGB-DATA, and the output start signal TP determines a point at which the data signals DS1 to DSm are output from the data driver 130.

The data driver 130 operates in response to a digital driving voltage DVDD from an external apparatus or device (not shown) as well as the analog driving voltage AVDD, the first source supply voltage VSS1 and the second source supply voltage VSS2 from the DC/DC converter 220. The data driver 130 includes a digital processor which receives the digital driving voltage DVDD and the first source supply voltage VSS1, and an analog processor which receives the analog driving voltage AVDD and the second source supply voltage VSS2. The digital processor and the analog processor will be described in further detail below with reference to FIG. 4.

In an exemplary embodiment the digital driving voltage DVDD has a level, and the analog driving voltage AVDD has a level greater than the level of the digital driving voltage DVDD. More specifically, in an exemplary embodiment, the digital driving voltage DVDD has a level of about 3.3V and the analog driving voltage AVDD has a level greater than the level of the digital driving voltage DVDD. In addition, the first source supply voltage VSS1 and the second source supply voltage VSS2 include ground voltage levels. However, a first interconnection, through which the first source supply voltage VSS1 is supplied to the digital processor, and a second interconnection, through which the second source supply voltage VSS2 is supplied to the analog processor, are separated from each other on the printed circuit board 200, as will be described in further detail below. Thus, the first source supply voltages VSS1 and/or the second source supply voltage VSS2 are effectively prevented from being affected, e.g., distorted or degraded, by noise generated from one of the first source supply voltage VSS1 and/or the second source supply voltage VSS2, for example.

In an exemplary embodiment, the data driver 130 converts the red, green and blue data RGB-DATA, which are digital signals, into the data signals DS1 to DSm, which are analog signals, based on the gamma voltages Vgamma1 to Vgammai supplied from the gamma voltage generator (not shown).

The gate driver 140 sequentially outputs the gate signals GS1 to GSn in response to the gate control signal. The gate control signal according to an exemplary embodiment includes a vertical start signal STV and a vertical clock signal CPV. The vertical start signal STV represents a start point of an operation of the gate driver 140, and the vertical clock signal CPV determines a point at which the gate signals GS1 to GSn are output from the gate driver 140. The gate-on voltage Von and the gate-off voltage Voff supplied to the gate driver 140 determine a high level and a low level, respectively, of the gate signals GS1 to GSn.

Figure 3:
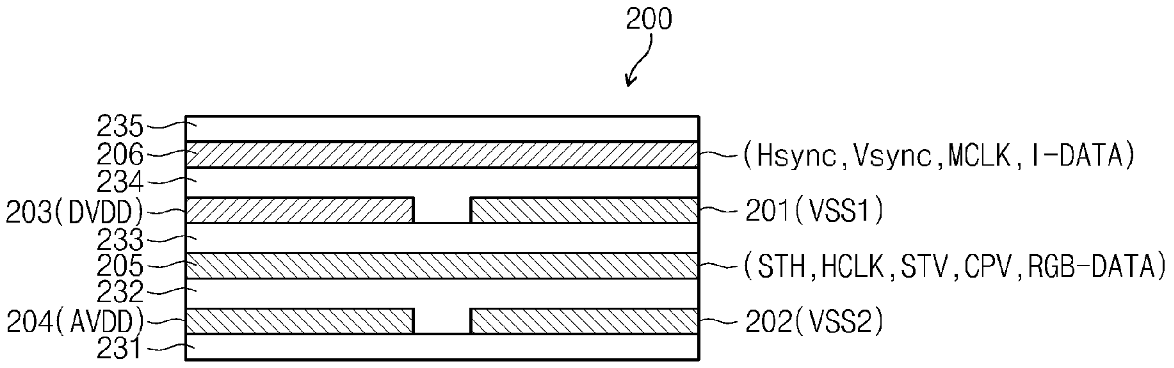
FIG. 3 is a partial cross-sectional view of an exemplary embodiment of a printed circuit board of the display apparatus shown in FIG. 1.

FIG. 3 is a partial cross-sectional view of an exemplary embodiment of a printed circuit board of the display apparatus shown in FIG. 1.

Referring to FIGS. 2 and 3, the printed circuit board 200 according to an exemplary embodiment includes a multilayer structure. Specifically, a first voltage interconnection 201 and a second voltage interconnection 202, which receive the first source supply voltage VSS1 and the second source supply voltage VSS2, respectively, from the DC/DC converter 220, are disposed on layers which are different from each other, are thus electrically isolated from each other. Further, a third voltage interconnection 203 and a fourth voltage interconnection 204, which receive the digital driving voltage DVDD and the analog driving voltage AVDD, respectively, are disposed on layers which are different from each other and are thus also electrically isolated from each other.

More particularly, the fourth voltage interconnection 204, to which the analog driving voltage AVDD is applied, and the second voltage interconnection 202, to which the second source supply voltage VSS2 is applied, are disposed on a base substrate 231 having an insulator. The second voltage interconnection 202 and the fourth voltage interconnection 204 are disposed on the same layer, while being electrically isolated from each other.

At least a portion of the second voltage interconnection 202 and the fourth voltage interconnection 204 are covered by a first insulating layer 232. The first insulating layer 232 has a plurality of first signal interconnections 205 disposed thereon. First signal interconnections 205 of the plurality of first signal interconnections 205 receive signals from the timing controller 210, as illustrated in FIG. 2, to provide the data driver 130 and the gate driver 140 with the signals. The signals provided through the first signal interconnections 205 may include, for example, the horizontal start signal STH, the horizontal clock signal HCLK, the vertical start signal STV, the vertical clock signal CPV and the red, green and blue data RGB-DATA.

at least a portion of each of the first signal interconnections 205 are covered by a second insulating layer 233. The third voltage interconnection 203, to which the digital driving voltage DVDD is applied, and the first voltage interconnection 201, to which the first source supply voltage VSS1 is applied, are disposed on the second insulating layer 233. Thus, the first voltage interconnection 201 and the third voltage interconnection 203 are disposed on the same layer while being electrically isolated from each other.

The first voltage interconnection 201 and the third voltage interconnection 203 are covered by a third insulating layer 234. The third insulating layer 234 has a plurality of second signal interconnections 206 thereon. Second signal interconnections 206 of the plurality of second signal interconnections 206 supply the signals (best shown in FIG. 2) from the connector 230 to the timing controller 210.

The signals provided from the connector 230 to the timing controller 210 may include, for example, the horizontal synchronization signal Hsync, the vertical synchronization signal Vsync, the main clock signal MCLK and the image data I-DATA.

A fourth insulating layer 235 is disposed on the second signal interconnections 206 to cover at least a portion of each of the second signal interconnections 206.

Thus in the printed circuit board 200 having the multilayer structure as described above, the first voltage interconnection 201, connected to the digital processor of the data driver 130, and the second voltage interconnection 202, connected to the analog processor of the data driver 130, are provided on different layers from each other. Thus, noise generated from one of the first source supply voltage VSS1 and the second source supply voltage VSS2 due to power loss, for example, which may occur in a chip on glass ("COG") process of mounting the data driver 130 on the liquid crystal display panel 100, does not affect the second source supply voltage VSS2 or the first source supply voltage VSS1, respectively, and distortion of either the first source supply voltage VSS1 and/or the second source supply voltage VSS2 is thereby effectively prevented. As a result, a driving margin of the data driver 130 according to an exemplary embodiment is substantially increased and/or is effectively maximized.

Figure 4:
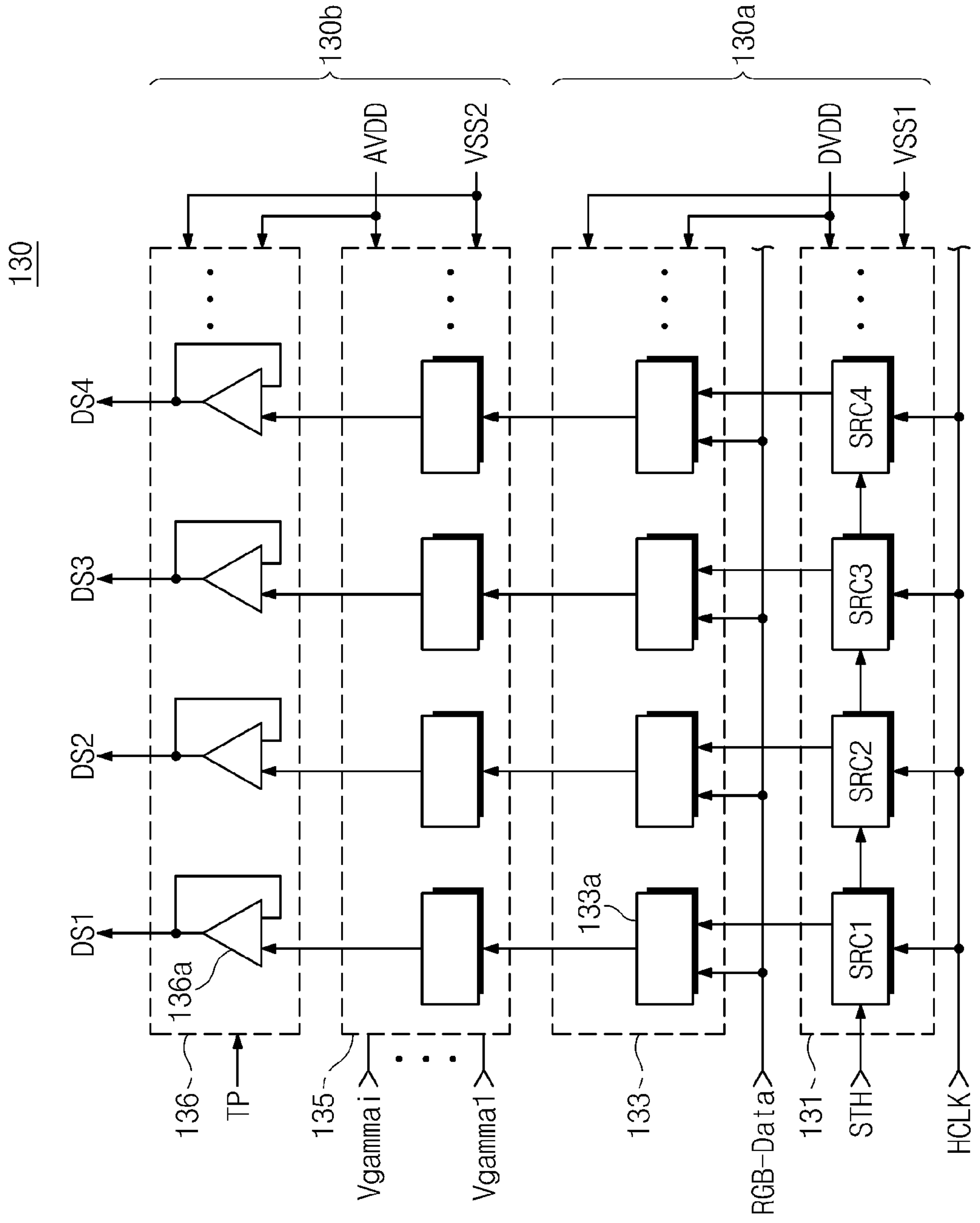
FIG. 4 is a block diagram of an exemplary embodiment of a data driver of the display apparatus shown in FIG. 2.

FIG. 4 is a block diagram of an exemplary embodiment of the data driver 130 of the display apparatus 400 shown in FIGS. 1 and 2.

Referring to FIG. 4, the data driver 130 includes a digital processor 130*a* and an analog processor 130*b*.

The digital processor 130*a* includes a shift register 131 and a latch unit 133. The shift register 131 and the latch unit 133 operate in response to the first source supply voltage VSS1 and the digital driving voltage DVDD received through the first voltage interconnection 201 and the third voltage interconnection 203 provided on the printed circuit board 200 (FIG. 3).

The shift register 131 according to an exemplary embodiment includes k stages SRC1 to SRCk (where k is a natural number greater than or equal to 2) sequentially connected with each other. Each stage of the shift register 131 receives the horizontal clock signal HCLK, and the first stage SRC1 receives the horizontal start signal STH. When the first stage SRC1 starts to operate in response to the horizontal start signal STH, the k stages SRC1 to SRCk sequentially output a control signal in response to the horizontal clock signal HCLK.

The latch unit 133 includes k latches 133*a* connected with the k stages SRC1 to SRCk in a one-to-one, e.g., corresponding manner. Thus, the k latches 133*a* store k data signals RGB-DATA in response to the control signal sequentially output from the k stages SRC1 to SRCk.

The analog processor 130*b* includes a digital-to-analog ("D/A") converter 135 and an output buffer 136. The D/A converter 135 and the output buffer 136 operate in response to the second source supply voltage VSS2 and the analog driving voltage AVDD received through the second voltage interconnection 202 and the fourth voltage interconnection 204 provided on the printed circuit board 200 (FIG. 3).

The D/A converter 135 converts the digital data signals RGB-DATA into the analog data signals DS1 to DSk based on the gamma voltages Vgammal to Vgammai, as described above.

The output buffer 136 includes k operational amplifiers ("OPAMPS") 136*a*. The output buffer 136 stores the analog data signals DS1 to DSk output from the D/A converter 135, and then supplies the analog data signals DS1 to DSk to the data lines DL of the liquid crystal display panel 100 in synchronization with the output start signal TP.

Figure 5:
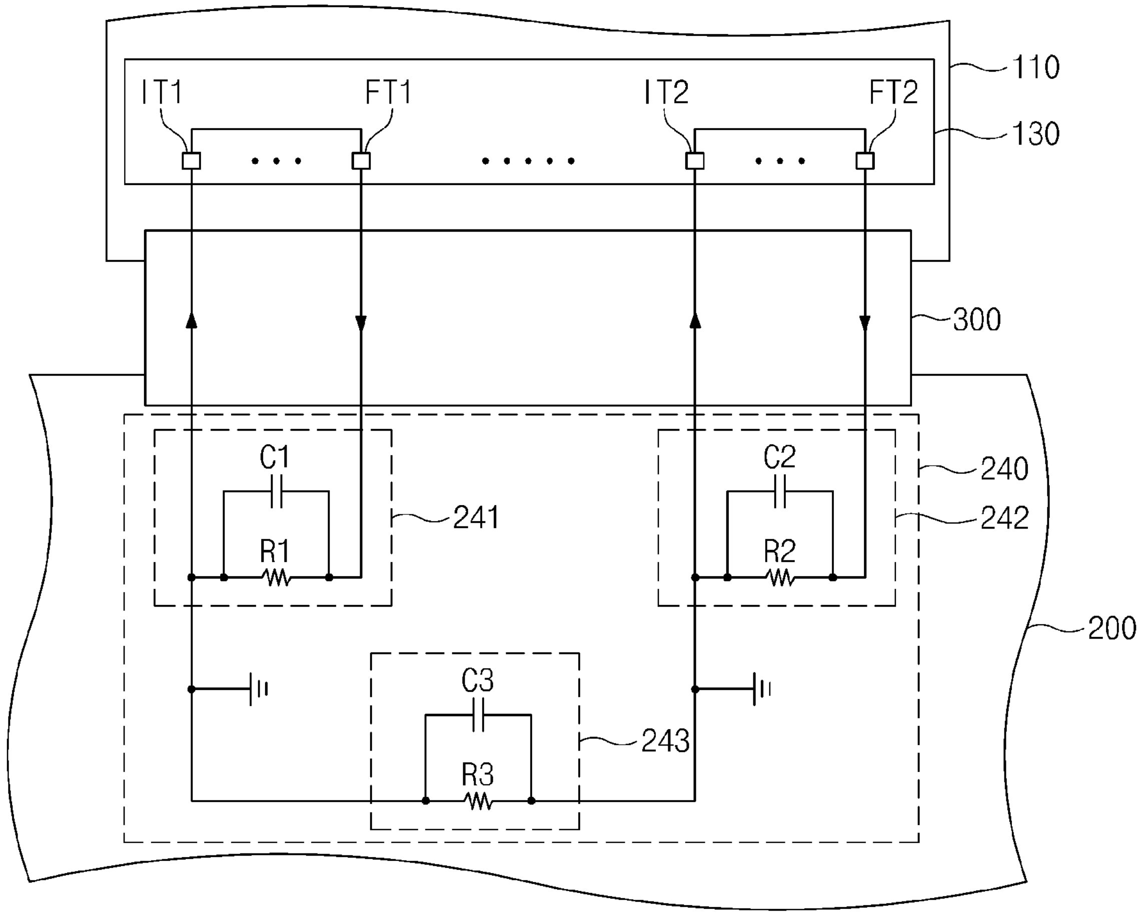
FIG. 5 is a plan view illustrating an exemplary embodiment of a voltage stabilizing circuit according to the present invention.

FIG. 5 is a plan view illustrating an exemplary embodiment of a voltage stabilizing circuit according to the present invention.

Referring to FIG. 5, the printed circuit board 200 according to an exemplary embodiment of the present invention further includes a voltage stabilizing circuit 240. The voltage stabilizing circuit 240 includes a first filter 241, a second filter 242 and a third filter 243, respectively, which receive the first source supply voltage VSS1 and the second source supply voltage VSS2 from the chips of the data driver 130 to filter noise therefrom. The first filter 241, the second filter 242 and the third filter 243 are disposed on the printed circuit board 200.

The data driver 130 includes a first terminal IT1, which is electrically connected to the first voltage interconnection 201 (FIG. 3) disposed on the printed circuit board 200 to receive the first source supply voltage VSS1, and a second terminal IT2, which is electrically connected to the second voltage interconnection 202 (FIG. 3) provided on the printed circuit board 200 to receive the second source supply voltage VSS2. The first voltage interconnections 201 and the second voltage interconnection 202 extend toward the array substrate 110 of the liquid crystal panel 100 via the flexible circuit substrate 300, so that the first voltage interconnection 201 and the second voltage interconnection 202 are electrically connected to the first terminal IT1 and the second terminal IT2 respectively.

The data driver 130 according to an exemplary embodiment further includes a first feedback terminal FT1, connected to the first terminal IT1 to feed back the first source supply voltage VSS1 to the voltage stabilizing circuit 240, and a second feedback terminal FT2, connected to the second terminal IT2 to feed back the second source supply voltage VSS2 to the voltage stabilizing circuit 240. The first feedback terminal FT1 and the second feedback terminal FT2 may include a dummy terminal (not shown) provided in the data driver 130.

Still referring to FIG. 5, the first filter 241 is disposed between the first terminal IT1 and the first feedback terminal FT1 to filter noise of the first source supply voltage VSS1 supplied from the first feedback terminal FT1, and supplies a first filtered source supply voltage VSS1 to the first terminal IT1. More specifically, the first filter 241 includes a first resistor R1 connected between the first terminal IT1 and the first feedback terminal FT1, and a first capacitor C1 connected in electrical parallel with the first resistor R1, as shown in FIG. 5. Thus, when the first source supply voltage VSS1 fed back through the first feedback terminal FT1 passes through the first filter 241, a noise component is removed therefrom and, as a result, only a direct current ("DC") component thereof is provided to the first terminal IT1.

Similarly, the second filter 242 includes a second capacitor C2 and a second resistor R2 connected in electrical parallel therewith, and both are is provided between the second terminal IT2 and the second feedback terminal FT2 to filter noise of the second source supply voltage VSS2 supplied from the second feedback terminal FT2, and supply the second source supply voltage VSS2 to the second terminal IT2. Likewise, the third filter 243 includes a third capacitor C2 and a third resistor R2 (connected in electrical parallel with the third capacitor C2) and is disposed between the first terminal IT1 and the second terminal IT2. In an exemplary embodiment the second filter 242 and the third filter 243 has a structure substantially the same as a structure of the first filter 241.

Thus, the voltage stabilizing circuit 240 is disposed on the printed circuit board 200, and a driving margin of the data driver 130, which would otherwise be reduced by the noise, is substantially increased in an exemplary embodiment of the present invention.

In addition, in a display apparatus according to an exemplary embodiment, the first source supply voltage and the second source supply voltage include a ground voltage level. However, since the first voltage interconnection and the second voltage interconnection are electrically isolated from each other on the printed circuit board, the first source supply voltage and the second source supple voltage are applied to the first voltage interconnection and the second voltage interconnection, respectively.

According to exemplary embodiments of the present invention as described herein, a first source supply voltage and a second source supply voltage are effectively prevented from being distorted due to noise generated from the first source supply voltage and/or the second source supply voltage. As a result, a driving margin of a data driver is substantially increased.

The present invention should not be construed as being limited to the exemplary embodiments set forth herein. Rather, these exemplary embodiments are provided so that this disclosure will be thorough and complete and will fully convey the concept of the present invention to those skilled in the art.

While the present invention has been particularly shown and described with reference to exemplary embodiments thereof, it will be understood by those of ordinary skill in the art that various changes in form and details may be made therein without departing from the spirit or scope of the present invention as defined by the following claims.

What is claimed is:

1. A display apparatus comprising:

a display panel which displays an image;

a printed circuit board comprising a control circuit which outputs image data, a data control signal and a gate control signal;

a data driver comprising a digital processor and an analog processor, and which receives the image data and the data control signal to provide the display panel with a data signal; and a gate driver which receives the gate control signal to provide the display panel with a gate signal, wherein the printed circuit board comprises:

a first voltage interconnection which supplies a first source supply voltage to the digital processor of the data driver; and a second voltage interconnection electrically isolated from the first voltage interconnection and which supplies a second source supply voltage to the analog processor of the data driver, wherein the printed circuit board comprises a multilayer structure, the first voltage interconnection is disposed on a first layer of the multilayer structure, and the second voltage interconnection is disposed on second layer different from the first layer, of the multilayer structure.

2. The display apparatus of claim 1, wherein the digital processor processes the image data in a digital form in synchronization with the data control signal, and the analog processor converts the image data in the digital form from the digital processor into an analog data signal.

3. The display apparatus of claim 1, wherein the first source supply voltage and the second source supply voltage comprise a ground voltage level.

4. The display apparatus of claim 1, wherein the printed circuit board further comprises:

a third voltage interconnection which supplies a digital driving voltage to the digital processor; and a fourth voltage interconnection electrically isolated from the third voltage interconnection and which supplies an analog driving voltage to the analog processor.

5. The display apparatus of claim 4, wherein the third voltage interconnection is disposed on the first layer of the multilayer structure, and the fourth voltage interconnection is disposed on the second layer of the multilayer structure.

6. The display apparatus of claim 1, wherein the data driver comprises at least one chip.

7. The display apparatus of claim 6, wherein the at least one chip is disposed on the display panel.

8. The display apparatus of claim 7, further comprising a flexible circuit film attached between the display panel and the printed circuit board to provide the at least one chip with a signal output from the printed circuit board.

9. The display apparatus of claim 1, wherein the data driver comprises:

a first terminal electrically connected to the first voltage interconnection to receive the first source supply voltage therefrom; and a second terminal electrically connected to the second voltage interconnection to receive the second source supply voltage therefrom.

10. The display apparatus of claim 9, further comprising a voltage stabilizing circuit which removes a noise component from the first source supply voltage and the second source supply voltage applied to the first terminal and the second terminal, respectively.

11. The display apparatus of claim 10, wherein the data driver further comprises:

a first feedback terminal electrically connected to the first terminal to supply the first source supply voltage to the voltage stabilizing circuit; and a second feedback terminal electrically connected to the second terminal to supply the second source supply voltage to the voltage stabilizing circuit.

12. The display apparatus of claim 11, wherein the voltage stabilizing circuit comprises:

a first filter disposed between the first terminal and the first feedback terminal and which filters a noise component of the first source supply voltage supplied from the first feedback terminal to supply a first filtered source supply voltage to the first terminal; and a second filter disposed between the second terminal and the second feedback terminal and which filters a noise component of the second source supply voltage supplied from the second feedback terminal to supply a second filtered source supply voltage to the second terminal.

13. The display apparatus of claim 12, wherein the voltage stabilizing circuit further comprises a third filter disposed between the first terminal and the second terminal.

14. The display apparatus of claim 10, wherein at least one of the first filter, the second filter and the third filter comprises:

at least one resistor; and at least one capacitor connected in electrical parallel with the at least one resistor.

15. The display apparatus of claim 10, wherein the voltage stabilizing circuit is disposed on the printed circuit board.

16. A voltage stabilizing circuit which removes noise components from a first source supply voltage and a second source supply voltage supplied to a first terminal and a second terminal, respectively, of a data driver of a display apparatus, the voltage stabilizing circuit comprising:

a first filter disposed between the first terminal and a first feedback terminal of the data driver, and which supplies the first source supply voltage to the first terminal, and which filters the noise component of the first source supply voltage, received from the first feedback terminal, to supply the first terminal with a first filtered source supply voltage; and a second filter disposed between the second terminal and a second feedback terminal of the data driver, and which supplies the second source supply voltage to the second terminal, and which filters the noise component of the second source supply voltage, received from the second feedback terminal, to supply the second terminal with a second filtered source supply voltage.

17. The voltage stabilizing circuit of claim 16, further comprising a third filter disposed between the first terminal and the second terminal.

18. The voltage stabilizing circuit of claim 17, wherein at least one of the first filter, the second filter and the third filter comprises:

at least one resistor; and at least one capacitor connected in electrical parallel with the at least one resistor.

* * * * *